United States Patent [19]

Wiesler

[11] 4,258,928
[45] Mar. 31, 1981

[54] PRECISION POSITIONING DEVICE

[75] Inventor: Mordechai Wiesler, Woburn, Mass.

[73] Assignee: Teledyne, Inc., Hawthorne, Calif.

[21] Appl. No.: 34,355

[22] Filed: Apr. 30, 1979

Related U.S. Application Data

[63] Continuation-in-part of Ser. No. 859,734, Dec. 12, 1977, Pat. No. 4,174,847.

[51] Int. Cl.³ .................................................. B23B 31/16
[52] U.S. Cl. ........................................ 279/1 L; 269/21; 269/111; 279/3; 279/112
[58] Field of Search .................. 279/1 R, 1 L, 3, 16, 279/68, 110, 112; 269/21, 42, 111, 112

[56] References Cited

U.S. PATENT DOCUMENTS

| | | | |
|---|---|---|---|
| 933,071 | 9/1909 | Helman | 279/1 R |
| 2,940,764 | 6/1960 | Krantz | 279/1 R |

*Primary Examiner*—Z. R. Bilinsky
*Attorney, Agent, or Firm*—Morse, Altman, Oates & Dacey

[57] ABSTRACT

A precision positioning device with a pair of relatively movable plates defining a carriage for four relatively movable guides. A centering port having a rectangular profile is formed by the guides which are constrained for mutually coating movement on the plates. The relative positions of the movable plates define the geometric shape of the centering port and the relative locations of the guides determine the size of the centering port. A pedestal configured to carry the article to be centered is positioned at the center of the centering port. A driver momentarily moves the guides and opens the centering port for reception of the article. Bias elements urge the guides against the item for centering the article on the collet.

17 Claims, 7 Drawing Figures

PRECISION POSITIONING DEVICE

CROSS-REFERENCE TO RELATED APPLICATIONS

The present application is a continuation-in-part of my pending application Ser. No. 859,734, filed Dec. 12, 1977 U.S. Pat. No. 4,174,847.

BACKGROUND OF THE INVENTION

1. Field of the Invention

The present invention relates to positioning devices and, more particularly, is directed towards precision positioning devices.

2. Description of the Prior Art

In the manufacturing industry, often times it is necessary to precisely position articles of manufacture during production. For example, during the production of semiconductor devices, semiconductor chips are separated from a monolithic wafer and precisely positioned for processing. Vacuum collets and reciprocating needles have been used for separating semiconductor chips from the monolithic wafer. The separated chips are carried to various stations for further processing such as wire bonding, packaging and the like. During processing, it is essential that the semiconductor chips are positioned precisely on the center of the vacuum collet. Various devices for positioning the chips on the collet have been met with limited success due to the time consuming readjustments that are required to ensure proper chip location. A need has arisen for a precise positioning devices which does not suffer from the foregoing disadvantages and limitations.

SUMMARY OF THE INVENTION

It is an object of the present invention to provide a precision centering device.

Another object of the present invention is to provide a self-adjusting precision positioning device for centering semiconductor chips on a vacuum collet. The device includes a pair of plates which are constrained for mutually coacting, slidable movement along parallel tracks that are mounted on a base. Each plate is provided a pair of slides. A centering guide is carried by each of the slides, the guides being constrained on the slides for mutually coacting movement along perpendicular axes. A centering port having a rectangular profile is bounded by the inner edges of the guides. The relative position of the plates on the base define the geometric profile of the centering port and the relative position of the guides govern the size of the centering port. For a given position of the plates, the center of the geometric profile of the centering port remains at the same point as the mutually coacting guides are moved to vary the size of the centering port. A driver momentarily moves the guides and opens the centering port for reception of the chip which is placed on a vacuum pedestal that is mounted at the center of the centering port. Bias elements urged the guides against the chip carried by the collet and center the chip on the collet.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
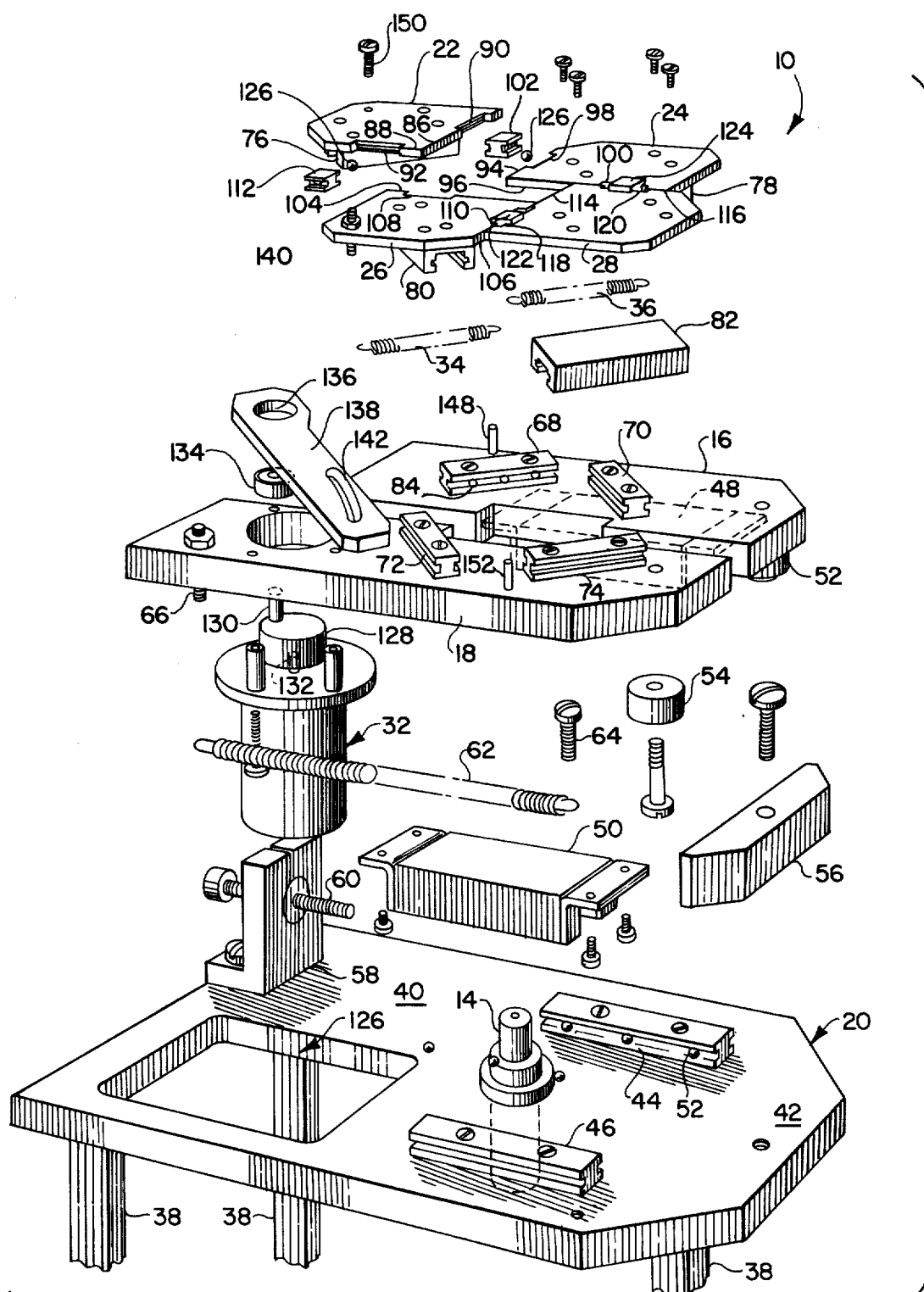
FIG. 1 is an exploded view, in perspective, of a precision positioning device embodying the invention.

Referring now to the drawings, particularly FIGS. 1, 2, 3 and 4, there is shown a precision positioning device 10 embodying the invention. In the illustrated embodiment, by way of example, positioning device 10 is configured to precisely position a semiconductor chip 12 at the center of a holder 14, for example a vacuum pedestal. Generally, positioning device 10 includes a pair of plates 16 and 18 which are constrained for mutually coacting, slidable movement along parallel axes on a base 20. A pair of guides 22, 24 is carried on plate 16 and a pair of guides 26, 28 are carried on plate 18, the guides being constrained for mutually coacting movement along perpendicular axes. A centering port 30 having a rectangular profile is formed between adjacent edges of guides 22, 24, 26 and 28, the particular geometric profile of the centering port being defined by the relative position of plates 16 and 18. A driver 32 moves guides 22, 24, 26 and 28 and opens centering port 30 for reception of semiconductor chip 12 which is carried by pedestal 14, the pedestal being disposed at the center of the centering port. Bias elements 34 and 36 move guides 22, 24, 26 and 28 inwardly against semiconductor chip 12 and precisely position the chip at the center of pedestal 14.

As best shown in FIG. 1, base 20 is supported on a plurality of legs 38. Base 20 includes a main body portion 40 that terminates in a head 42 at a forward end. Body 40 has a substantially rectangular profile and head 42 has a substantially truncated triangular profile. A pair of slide guides 44 and 46 are mounted on base 20 in spaced parallel relationship to a longitudinal axis of the base adjacent head 42. A pair of slides 48 and 50 are constrained for slidable movement on slide guides 44 and 46, respectively. A plurality of ball bearings 52 are disposed between adjacent surfaces of slide guides 44, 46 and slides 48, 50. Slide 48 is mounted to the underside of plate 16 and slide 50 is mounted to the underside of plate 18. A pair of rollers 52 and 54 are rotatably mounted to plates 16 and 18, respectively, forward of slides 48 and 50. Rollers 52 and 54 contact a nose piece 56 that is pivotally mounted to head 42. Plates 16 and 18 are slidably movable along parallel axes on slides 48 and 50. A right angle bracket 58, which is mounted to base 20, is provided with an adjusting member 60, for example a screw, that is positioned to contact plate 16. As screw 60 is turned inwardly, the end of the screw urges plate 16 forwardly and roller 52 pushes against nose 56. Nose 56 pivots and roller 54 pushes plate 18 rearwardly against the force of a bias element 62, for example a spring. One end of spring 62 is fixed to base 20 by a screw 64 and the other end of the spring is attached to a post 66 on plate 18. When screw 60 is turned outwardly, plate 16 is free to slide rearwardly. The force of spring 62 slides plate 18 forwardly and roller 52 pushes against nose 56. Nose 56 pivots and rollers 54 pushes plate 16 rearwardly. From the foregoing, it will be readily apparent that plates 16 and 18 are constrained for mutually coacting slidable movement along parallel axis on base 20.

A pair of slide guides 68 and 70 are mounted on plate 16 in spaced perpendicular relationship to one another and a pair of slide guides 72 and 74 are mounted on plate 18 in spaced perpendicular relationship to one another. Slide guide 68 is parallel to slide guide 74 and perpendicular to parallel slide guides 70 and 72. The longitudinal axes of slide guides 68, 70, 72 and 74 intersect and define a rectangular path. That is, the longitudinal axis of any one of slide guides 68, 70, 72 and 74 is parallel to the opposite slide guide and perpendicular to the adjacent slide guide. Slides 76, 78, 80 and 82 are constrained for slidable movement on slide guides 68, 70, 72 and 74, respectively. A plurality of ball bearings 84 are disposed between adjacent surfaces of slide guides 68, 70, 72, 74 and slides 76, 78, 80, 82 for free sliding movement between the guides and slides. Slide 76 is mounted to the underside of guide 22, slide 78 is mounted to the underside of guide 24, slide 80 is mounted to the underside of guide 26, and slide 82 is mounted to the underside of guide 28. Accordingly, guides 22, 24, 26 and 28 are constrained for slidable movement along axes that define a rectangular path, adjacent edges of the guides in abutting relationship for mutual coacting movement.

Guides 22, 24, 26 and 28 have congruent profiles. Guide 22 has a pair of working sides 86 and 88 that are perpendicular to one another. Sides 86 and 88 are formed with cutouts 90 and 92, respectively. Guide 24 has a pair of working sides 94 and 96 that are perpendicular to one another. Sides 94 and 96 are formed with cutouts 98 and 100, respectively. Cutouts 90 and 98 are positioned opposite one another and form a substantially rectangular opening that is configured to captively hold a ball race 102. Guide 26 has a pair of perpendicular working sides 104 and 106 that are formed with cutouts 108 and 110, respectively. Cutouts 92 and 104 are positioned opposite one another and form a substantially rectangular opening that is configured to captively hold a ball race 112. Guide 26 has a pair of working sides 114 and 116 that are perpendicular to one another. A pair of cutouts 118 and 120 are formed in working sides 114 and 116. Cutouts 110 and 118 are positioned opposite one another and form a substantially rectangular opening that is configured to captively hold a ball race 122. Cutouts 100 and 120 are positioned opposite one another and form a substantially rectangular opening that is configured to captively hold a ball race 124. A plurality of ball bearings 126 are positioned in ball races 102, 112, 122 and 124 to provide free sliding movement of mutually coacting guides 22, 24, 26 and 28. Working sides 86, 94; 96, 116; 106, 114; and 88, 104 are in mating relationship and form centering port 30. As previously indicated, guides 22, 24, 26 and 28 are constrained for mutually coacting movement by driver 32.

Driver 32, for example a motor, is mounted to plate 18, the body of the motor being received in an enlarged opening 126 formed in base 20. In alternate embodiments, driver 32 is other than a motor, for example, a reciprocating air piston or an actuator such as a solenoid. A cam 128 with an eccentrically disposed, projecting pin 130 is mounted to a shaft 132 of motor 32. A bearing 134, which is mounted on pin 130, is fitted in an opening 136 formed in a drive link 138. A stud 140, which extends from the underside of plate 26, is received within an arcuate slot 142 that is formed in the forward end of drive link 138. The arrangement of cam 128 and drive link 138 is such that the drive link moves in a reciprocating linear path, which is parallel to a longitudinal axis of slide guide 72, in response to rotation of shaft 132.

Figure 2:
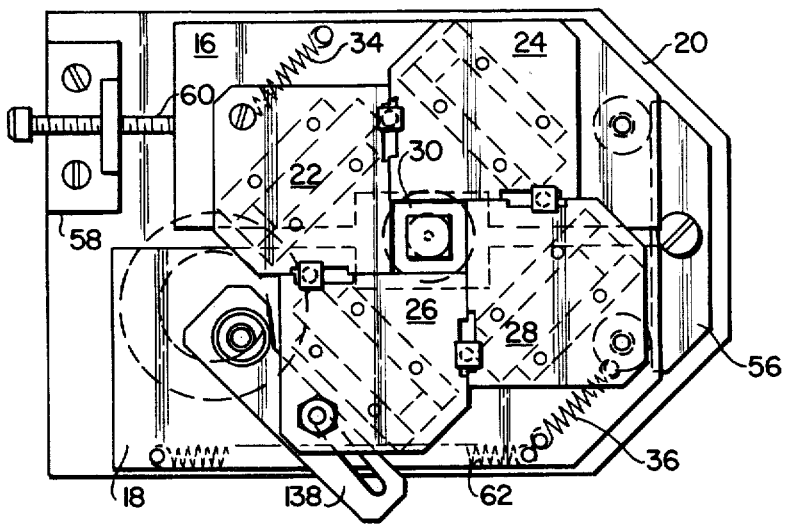
FIG. 2 is a top plan view of the precision positioning device having an opened square centering port.
Figure 3:
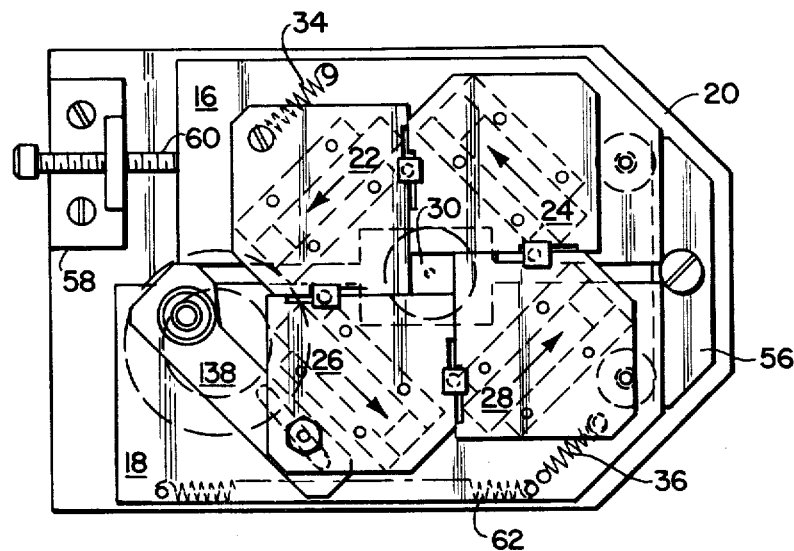
FIG. 3 is a top plan view of the precision positioning device of FIG. 2 with the centering port closed.
Figure 4:
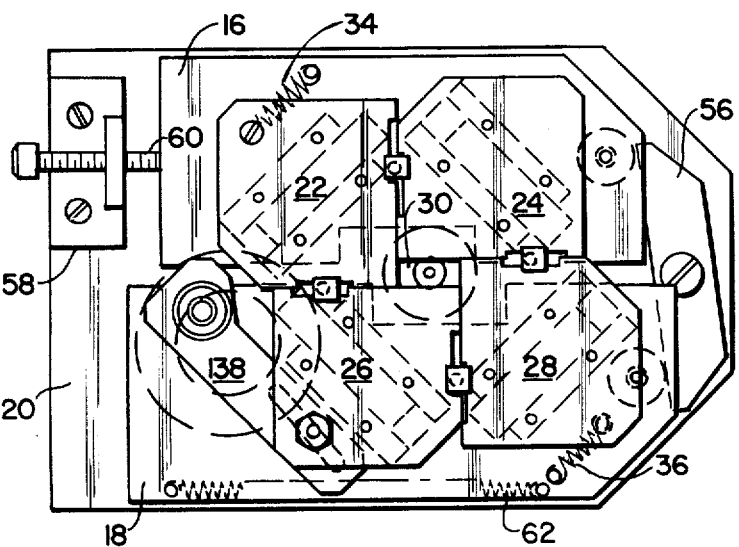
FIG. 4 is a top plan view of the precision positioning device having rectangular centering port.
Figure 5:
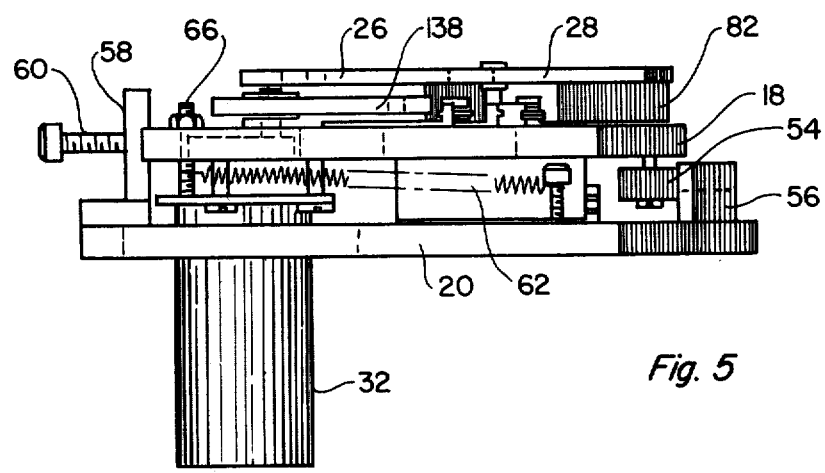
FIG. 5 is a sectional side view of the precision positioning device.

As shown in FIG. 2, when pin 130 is closest to guide 26, drive link 138 is in its most forward position. When pin 130 is farthest away from guide 26, FIG. 3, drive link 138 is in its most rearward position. As drive link 138 is moved from its most rearward position to its most forward position by motor 32, stud 140, which is freely movable in slot 142, contacts the rear of the slot and is carried forwardly by the forward motion of the drive link. As viewed in FIGS. 2 and 3, when stud 140 is moved forwardly, it drives guide 26 in a southeasterly direction. In turn, guide 26 drives guide 28 in a northeasterly direction, which causes guide 24 to move in a northwesterly direction. The northwesterly movement of guide 24 moves guide 22 in a southwesterly direction. As guides 22, 24, 26 and 28 move in the direction just described, centering port 30 is opened or becomes larger. Ball races 102, 112, 122 and 124 are operative to minimize frictional forces at adjacent sides of guides 22, 24, 26 and 28.

As drive link 138 is moved from its most forward position to its most rearward position by motor 32, the rear of slot 142 moves away from stud 140. Bias elements 34 and 36, for example springs, move guides 22, 24, 26 and 28 in directions opposite to that just described and close centering port 30. One end of spring 34 is connected to a pin 148 on plate 16 and the other end is constrained by a screw 150 in guide 22. One end of spring 36 is attached to pin 152 and the other end is held by a screw 154 in guide 28. When guides 22, 24, 26 and 28 are moved in directions to open centering port 30, springs 34 and 36 are stretched. The tension on springs 34 and 36 is sufficient to move guides 22, 24, 26 and 28 in directions to close centering port 30.

As previously indicated, the geometric shape of centering port 30 is governed by the relative positions of plates 16 and 18. In the embodiment shown in FIGS. 2 and 3, centering port 30 has a square profile. In the embodiment depicted in FIG. 4, screw has been turned outwardly, plate 16 has moved left, and plate 18 has moved right. Consequently, the profile of centering port 30 has changed to a centering port 30' having a rectangular profile. The center of rectangular centering port 30' is the same as the center of square centering port 30. That is, although the geometric profile of the centering port varies as a function of the relative positions of plates 16 and 18, the location of the center of the centering port remains in registration with the center of pedestal 14.

Figure 6:
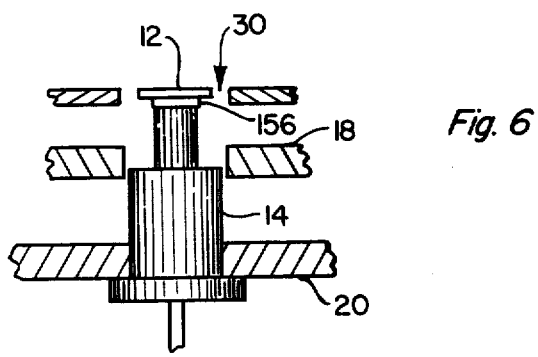
FIG. 6 is a sectional side view showing the vacuum collet with a semiconductor chip off center.
Figure 7:
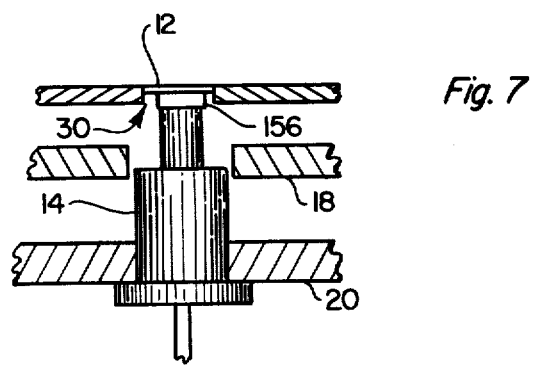
FIG. 7 is a sectional side view showing the semiconductor chip centered on the vacuum collet.

In one example of operation of precision positioning device 10 for centering semiconductor chip 12 having a square profile, screw 60 is adjusted so that centering port 30 has a square profile. Motor 32 is energized and centering port 30 is opened. Semiconductor chip 12 is placed on top of vacuum pedestal 14 at the center of centering port 30. As shown in FIG. 6, by way of example, semiconductor chip 12 is carried off center on a head 156 of vacuum pedestal 14. As drive link 138 moves rearwardly by continued rotation of shaft 132, centering port 30 closes and precisely centers semiconductor chip 12 on pedestal 14.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A precision positioning device comprising:
  (a) a base;
  (b) a pair of plates mounted on said base for relative slidable movement along parallel axes;
  (c) a plurality of relatively movable guides constrained for mutually coacting movement on said plates, a port of predetermined geometrical configuration formed between said guides, said geometrical configuration governed by the relative positions of said plates; and
  (d) driver means operatively connected to at least one of said guides for moving each of said guides, the size of said port determined by the relative positions of said guides.

2. The precision positioning device as claimed in claim 1 wherein the number of guides is four, two of said guides mounted on one of said plates and the other two of said guides mounted on the other one of said plates.

3. The precision positioning device as claimed in claim 2 wherein each of said guides has a pair of working sides that are in perpendicular relationship, one working side of one of each said guide parallel to and adjacent to one working side of another one of said guides.

4. The precision positioning device as claimed in claim 3 wherein each of said working sides is formed with a cutout, sliding means captively held in an opening formed between said cutouts of adjacent working sides of said guides.

5. The precision positioning means as claimed in claim 1 including a plurality of first slide means, the number of first slide means corresponding to the number of said guides, said first slide means mounted to said plates and said guides, said guides slidably movable with respect to said plates on said first slide means.

6. The precision positioning device as claimed in claim 5 wherein the number of guides is four and the number of first slide means is four, two of said first slide means in engagement with two of said guides and one of said plates, the other two of said first slide means in engagement with the other two of said guide means and the other one of said plates.

7. The precision positioning device as claimed in claim 6 wherein said guides are constrained by said first slide means for coacting movement along mutually perpendicular axes.

8. The precision positioning device as claimed in claim 7 including a pair of second slide means mounted to said plates and said base, said plates movable on said second slide means along parallel axes on said base.

9. The precision positioning device as claimed in claim 8 including a nose piece pivotally mounted to said base, one end of each said plate in engagement with said nose piece, movement of one of said plates in a first direction pivots said nose piece which moves the other of said plates in a second direction, said first direction opposite said second direction.

10. A precision device for centering a workpiece, said device comprising:
  (a) a base;
  (b) a pair of plates mounted on said base for relative slidable movement along parallel axes;
  (c) a plurality of relatively movable guides constrained for coacting movement on said plates along mutually perpendicular axes, a port of predetermined geometrical configuration formed between said guides, said geometrical configuration governed by the relative positions of said plates;
  (d) driver means operatively connected to at least one of said guides for moving each of said guides, the size of said port determined by the relative position of said guides; and
  (e) holder means within said port at the center thereof, said holder means configured to hold the workpiece, the center of said port remaining at a fixed point for various geometrical configurations of said port.

11. The precision centering device as claimed in claim 10 wherein the number of guides is four, two of said guides mounted on one of said plates and the other two of said guides mounted on the other one of said plates, each of said guides having a pair of working sides that are in perpendicular relationship, one working side of one of each said guide parallel to and adjacent to one working side of another one of said guides.

12. The precision centering device as claimed in claim 11 wherein a first of said guides is movable along a first axis, a second of said guides is movable along a second axis, a third of said guides is movable along a third axis, and a fourth of said guides is movable along a fourth axis, said first axis parallel to said second axis, said third axis parallel to said fourth axis, said first axis perpendicular to said third axis.

13. The precision centering device as claimed in claim 12 wherein said port has a rectangular profile, said first guide and said second guide constituting two opposite walls of said port, said third guide and said fourth guide constituting the other two opposite walls of said port.

14. The precision centering means as claimed in claim 10 including a plurality of first slide means, the number of first slide means corresponding to the number of said guides, said first slide means mounted to said plates and said guides, said guides slidably movable with respect to said plates on said first slide means, said guides are constrained by said first slide means for coacting movement along mutually perpendicular axes.

15. The precision centering device as claimed in claim 14 wherein the number of guides is four and the number of first slide means is four, two of said first slide means in engagement with two of said guides and one of said plates, the other two of said first slide means in engagement with the other two of said guide means and the other one of said plates.

16. The precision positioning device as claimed in claim 15 including a pair of second slide means mounted to said plates and said base, said plates movable on said second slide means along parallel axes on said base.

17. A precision positioning device for centering a workpiece, said device comprising:
  (a) a base;

(b) a pair of plates mounted on said base for relative slidable movement along parallel axes;

(c) a plurality of relatively movable guides constrained for mutually coacting movement on said plates, each of said guides having a pair of working sides that are in perpendicular relationship, one working side of one of each said guide parallel to and adjacent to one working side of another one of said guides, a port of predetermined geometrical configuration formed between said guides, said geometrical configuration governed by the relative position of said plates;

(d) driver means operatively connected to at least one of said guides for moving each of said guides, the size of said port determined by the relative position of said guides; and (e) holder means at the center of said port for holding the workpiece.

* * * * *